United States Patent
Yanagisawa (10) Patent No.: US 7,907,200 B2
(45) Date of Patent: Mar. 15, 2011

(54) SEAMLESS IMAGE VIEWING SYSTEM AND METHOD

(75) Inventor: Takuma Yanagisawa, Tsurugashima (JP)

(73) Assignee: Pioneer Corporation, Tokyo (JP)

(*) Notice: Subject to any disclaimer, the term of this patent is extended or adjusted under 35 U.S.C. 154(b) by 883 days.

(21) Appl. No.: 11/662,946

(22) PCT Filed: Aug. 25, 2005

(86) PCT No.: PCT/JP2005/015476
§ 371 (c)(1),
(2), (4) Date: Jul. 13, 2007

(87) PCT Pub. No.: WO2006/030613
PCT Pub. Date: Mar. 23, 2006

(65) Prior Publication Data
US 2007/0285338 A1    Dec. 13, 2007

(30) Foreign Application Priority Data
Sep. 15, 2004    (JP) .................... 2004-267738

(51) Int. Cl.
*H04N 5/222* (2006.01)
*H04N 5/225* (2006.01)
*G09G 5/00* (2006.01)

(52) U.S. Cl. ............... 348/333.01; 348/335; 345/7

(58) Field of Classification Search ............. 345/7–9; 348/333.01, 333.02, 333.06, 333.08, 333.09, 348/335
See application file for complete search history.

(56) References Cited

U.S. PATENT DOCUMENTS

| 5,550,585 | A | 8/1996 | Cherri | |
| 5,815,411 | A * | 9/1998 | Ellenby et al. | 702/150 |
| 6,094,241 | A | 7/2000 | Yamazaki | |
| 6,259,470 | B1 * | 7/2001 | Koizumi et al. | 348/14.1 |
| 6,408,257 | B1 | 6/2002 | Harrington et al. | |
| 6,980,363 | B1 * | 12/2005 | Takagi et al. | 359/630 |

FOREIGN PATENT DOCUMENTS

| JP | 8-063089 A | 3/1996 |
| JP | 11-174367 A | 7/1999 |
| JP | 2001-092995 A | 4/2001 |
| JP | 2001-211403 A | 8/2001 |
| JP | 3092719 U | 1/2003 |
| JP | 2004-064131 | 2/2004 |

OTHER PUBLICATIONS

T. Naemura et al., "A Real-Time System for Image-Based Rendering from a Multi-View Video—Video Based Rendering," TVRSJ, vol. 4, No. 4, 1999, pp. 639-646.
Takaaki Endo et al., "Mixed Reality," OPTRONICS (2002) No. 2, pp. 137-141, with English translation, pp. 1-9.

* cited by examiner

*Primary Examiner* — Timothy J Henn
(74) *Attorney, Agent, or Firm* — Foley & Lardner LLP (57) ABSTRACT

An image display system according to the present invention includes a camera that shoots a background, a monitor that displays a shot background image, and an optical lens arranged on a display surface of the monitor. An imaginary image, obtained due to presence of the optical lens, of the monitor image is made to substantially match with a background surface, so that observers viewing the background through the monitor can recognize that the monitor image and the background look continuous. As a result, the image display system and the image display method that can cause the observers viewing the background through the monitor to recognize that the monitor image and the background look continuous are provided.

8 Claims, 10 Drawing Sheets

SEAMLESS IMAGE VIEWING SYSTEM AND METHOD

TECHNICAL FIELD

The present invention relates to an image display system and an image display method, and more particularly, to an image display system and an image display method that cause observers to recognize that a monitor image and a background look continuous.

BACKGROUND ART

There have been techniques called as "augmented reality" or "mixed reality" for displaying a virtual image overlapped with the real world. Some of those techniques have been in practical use (see, for example, Non-patent document 1). Those techniques can be roughly classified into optical see-through (see, for example, Patent document 1) and video see-through (see, for example, Patent document 2) based on method of displaying the augmented reality.

Figure 16:
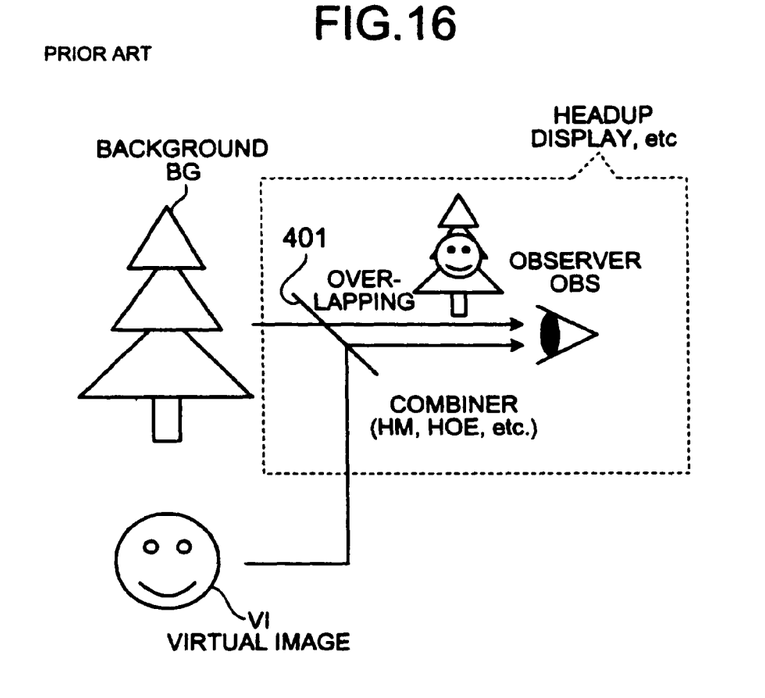

FIG. 16 is a schematic for explaining the optical see-through. In the optical see-through, as shown in FIG. 16, using a semitransparent display panel 401, the optical see-through causes an observer OBS to visually recognize an overlapped image of a virtual image VI and a background BG. The virtual image VI being an image electronically displayed on the semitransparent display panel 401, and the background BG being the real world viewed through the semitransparent display panel 401.

Figure 17:
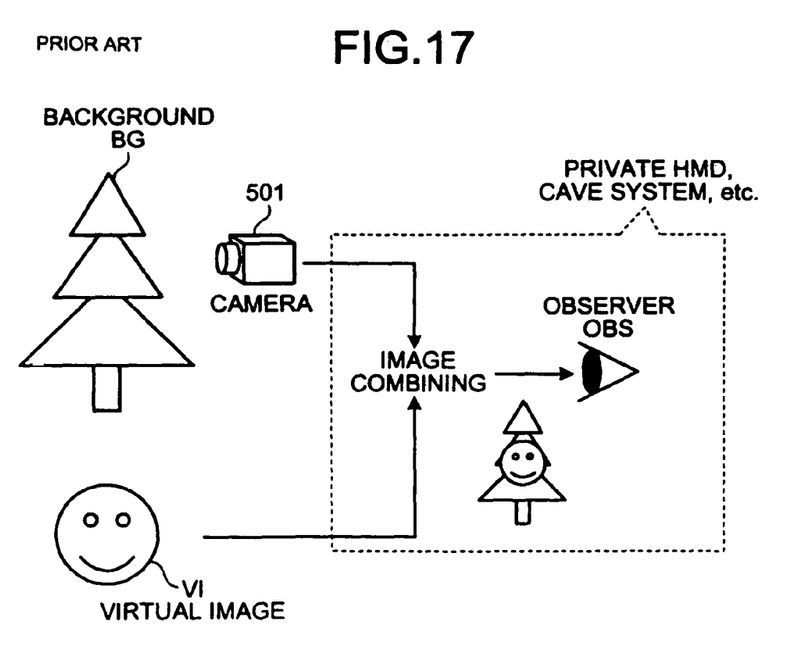

FIG. 17 is a schematic for explaining the video see-through. In the video see-through, as shown in FIG. 17, using a wearable head-mounted display, a CAVE system, or the like, the virtual image VI is electronically combined with a background image of the real world shot by a camera 501, and the combined image is displayed.

Patent document 1: Japanese Patent Application Laid-open No. H11-174367

Patent document 2: Japanese Patent Application Laid-open No. 2001-92995

Non-patent document 1: "Mixed reality", by Takaaki Endo et al., in OPTRONICS (2002) No. 2, pages 137 to 141

DISCLOSURE OF INVENTION

Problem to be Solved by the Invention

However, in the optical see-though, because the virtual image VI is optically overlapped with the real world, it is necessary that the virtual VI is semitransparent. This makes it impossible to properly match the image that is electronically displayed with a spectacle of the real world that is viewed merely optically through the semitransparent display panel so that the resultant image lacks reality. There has been another problem that, because the virtual image VI is dark, it is difficult to recognize the virtual image VI in a bright real environment.

On the other hand, it is possible to display a realistic image in the video see-through. However, because the video see-through requires highly specific image display system, such as the wearable head-mounted display and the CAVE system, there have been problems that there is limitation on a visual field and a motion of the observer OBS. Moreover, the highly specific image display system with which the observer OBS can not directly view the real world makes it difficult to be used in real life. In other words, the system can be used only for specific applications such as experience-based games or simulations.

The present invention is made in consideration of the above, and it is an object of the present invention to provide an image display system and an image display method that makes it possible to realize augmented reality in the day-to-day life, while maintaining the reality of an image, that causes an observer to feel that he is viewing a real world.

When the observer views the monitor, the monitor may become an obstacle, so that the observer can not visually recognize a part of the background that is behind the monitor. Sometimes the observer may like to view the hidden part, or the part of the background behind the monitor.

The present invention is made in consideration of the above, and it is another object of the present invention to provide an image display system and an image display method that can cause the observer viewing the monitor to recognize that the monitor image and the background look continuous.

Means for Solving Problem

To solve the above problems, and achieve the above objects, according to an aspect of the present invention, an image display system that causes an observer to recognize that a monitor image and a background look continuous includes a monitor that displays a shot background image; and an optical lens that is arranged on a display surface side of the monitor, wherein an imaginary image, obtained due to presence of the optical lens, of the monitor image is made to substantially match with a background surface.

Moreover, according to another aspect of the present invention, an image display method that causes an observer to recognize that a monitor image and a background look continuous includes a step of shooting the background; and a step of displaying a shot background image on a display surface of the monitor at which an optical lens is arranged, wherein an imaginary image, obtained due to presence of the optical lens, of the monitor image is made to substantially match with a background surface.

BRIEF DESCRIPTION OF DRAWINGS

FIG. 16 is a schematic for explaining optical see-through.

FIG. 17 is a schematic for explaining video see-through.

EXPLANATIONS OF LETTERS OR NUMERALS

100 Image display system
101 Display monitor
102 Camera
103 Distance measuring unit
104 Optical lens
105 Distance adjustment mechanism
106 Image processing unit
111 Combined-image generating section
112 Display-size converting section
100 Image display system
201 Shielding object
300 Image display system
301 Multi-lens camera
302 Image processing unit
311 Viewpoint-converted image generating section
312 Combined-image generating section
313 Display-size converting section
314 Distance calculating section

BEST MODE(S) FOR CARRYING OUT THE INVENTION

The present invention is explained in detail below with reference to the drawings. The present invention is not limited to these embodiments. The embodiments described below include objects that can be easily supposed by those in the art or substantially identical objects as constituents.

(Principle of the Present Invention)

Figure 1:
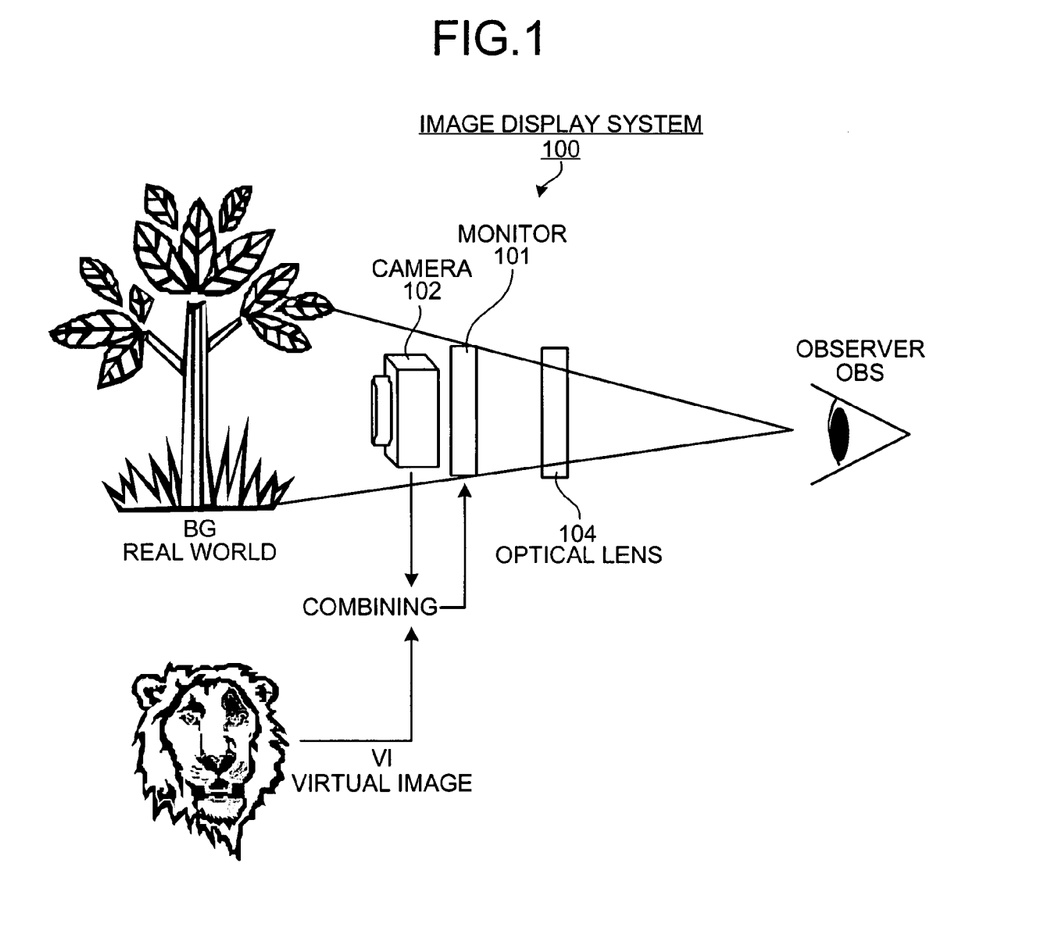
FIG. 1 is a schematic for explaining a principle of the present invention.

FIG. 1 is a schematic for explaining a principle of an image display system according to the present invention. In the present invention, as shown in FIG. 1, a monitor 101 is arranged between an observer OBS and a background BG, and an optical lens 104 is arranged between a display surface of the monitor 101 and the observer OBS. An image of the background BG is shot by a camera 102, the shot background image is combined with a virtual image VI, and the combined image is displayed on the monitor 101. An imaginary image, obtained due to presence of the optical lens 104, of the monitor image is made to substantially match with a background surface by adjusting a distance between the optical lens 104 and the monitor 101 so that it is possible to cause the observer OBS to recognize that the monitor image and the background BG look continuous. Thereby, it is possible to obtain an effect of realization of augmented reality in the day-to-day life, while maintaining the reality of an image that is an advantage of the video see-through, that causes an observer to feel that he is viewing a real world.

First Embodiment

Figure 2:
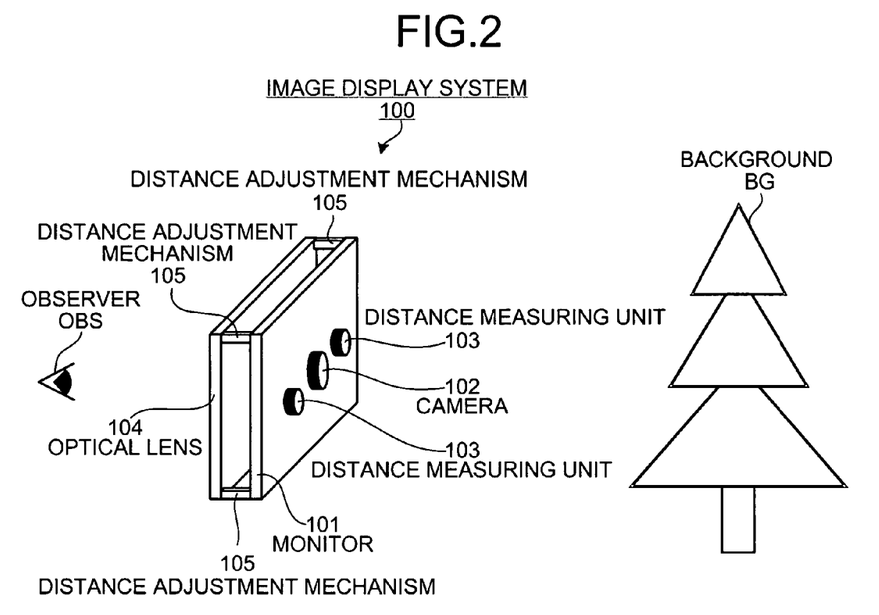
FIG. 2 is an overview schematic of an image display system according to a first embodiment.

FIG. 2 is an overview schematic of an image display system 100 according to a first embodiment. As shown in FIG. 1, the image display system 100 is arranged between the background BG and the observer OBS. In the figure, the reference numeral 101 denotes a monitor; 102 denotes a camera; 103 denotes a distance measuring unit; 104 denotes an optical lens; and 105 denotes a distance adjustment mechanism. The camera 102 and the distance measuring unit 103 are arranged on a background surface, which is a surface toward the background BG, of the monitor 101. The optical lens 104 is arranged opposed to a display surface (monitor surface) of the monitor 101 with the help of four units of the distance adjustment mechanisms 105. The distance adjustment mechanism 105 is configured to be extensible, and fixed to the display surface of the monitor 101 at one end and to the optical lens 104 at the other end.

Figure 3:
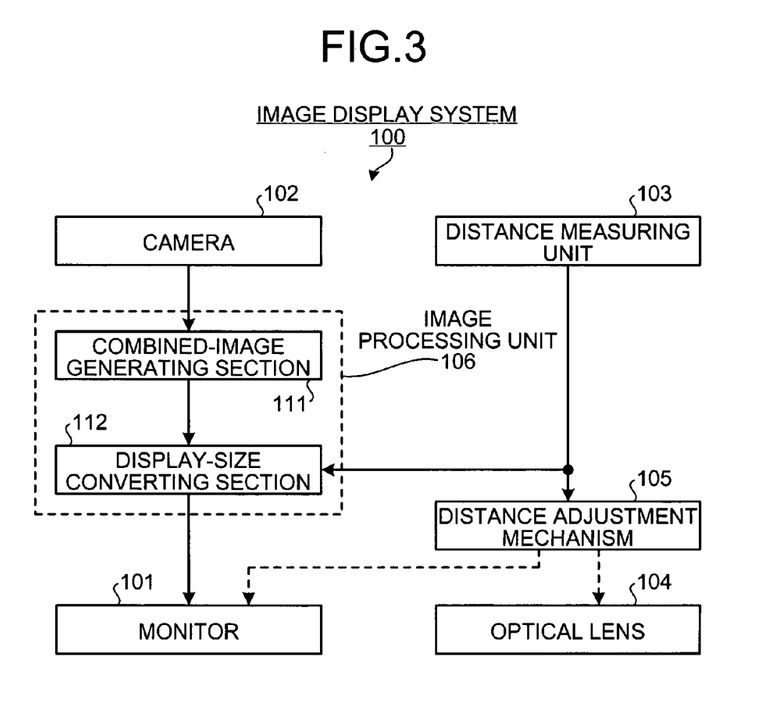
FIG. 3 is a block diagram of the image display system according to the first embodiment.

FIG. 3 is a block diagram of the image display system 100 shown in FIG. 2. The configuration of the image display system 100 is explained in detail with reference to FIG. 3. The monitor 101 displays video images input from an image processing unit 106. The monitor 101 can be configured with a CRT; a flat display panel such as a liquid crystal panel, a plasma display panel, an EL display panel; a flexible display, or the like.

The camera 102 shoots video images or still images of the background and outputs the shot background images to the image processing unit 106. Image shooting means such as a video camera or a digital camera can be used as the camera 102. The image processing unit 106 includes a combined-image generating section 111 and a display size variable-magnification section 112. The combined-image generating section 111 generates a combined image by combining an additional image, which can be a desired image (the virtual image VI, etc.) or text information, with the background image in response to an instruction from a not shown controller. If the combined-image generating section 111 does not receive an instruction to perform the image combining from the not shown controller, it does not perform the image combining. The display size variable-magnification section 112 (varies) magnifies or reduces the background image or the combined image based on the distance l between the monitor 101 and the background surface measured by the distance measuring unit 103 and outputs the magnified/reduced image to the monitor 101. The combining of the additional image can be performed after the magnification or reduction of the background image.

The distance measuring unit 103 measures the distance l between the monitor 101 and the background surface and outputs the distance l to the display size variable-magnification section 112 of the image processing unit 106 and the distance adjustment mechanism 105. The distance measuring unit 103 can be configured with an infrared sensor, an ultrasonic sensor, a twin-lens camera, or the like. When a twin-lens camera is used, the distance can be detected by using the well-known stereo method (which is a method of measuring a distance based on the principle of triangulation from a matching point in images obtained by two cameras).

The distance adjustment mechanism 105 is extended or shortened depending on the distance l between the monitor 101 and the background surface thereby adjusting the distance between the monitor 101 and the optical lens 104. The distance adjustment mechanism 105 can be configured with, for example, an actuator, and a driving circuit that drives the actuator. The optical lens 104 is used for substantially matching a parallax between the monitor surface (display surface) of the monitor 101 and the background surface. The optical lens 104 can be configured with a resin lens, such as a glass lens or a Fresnel lens.

A display operation performed by the image display system 100 shown in FIGS. 2 and 3 and a principle of the display operation are explained below with reference to FIGS. 4 to 7. The background shot by the camera 102 is output to the combined-image generating section 111 of the image processing unit 106. The distance measuring unit 103 measures the distance l between the monitor 101 and the background surface and outputs the measured distance l to the display-size converting section 112 of the image processing unit 106 and the distance adjustment mechanism 105.

The combined-image generating section 111 generates the combined image by combining an additional image with the background image in response to an instruction from the not shown controller. The display-size converting section 112 (varies) magnifies or reduces the background image or the combined image by using later described Conditional Expression (X2). Conditional Expression (X2) determines a size (magnification) of the background image based on the distance l between the monitor 101 and the background surface. The magnified/reduced background image or the magnified/reduced combined image is displayed on the monitor 101.

The distance adjustment mechanism 105 adjusts the distance d between the monitor 101 and the optical lens 104 by using later described Conditional Expression (X1). Conditional Expression (X2) substantially matches the parallax between the monitor image and the background BG based on the distance l between the monitor 101 and the background surface detected by the distance measuring unit 103.

Figure 4:
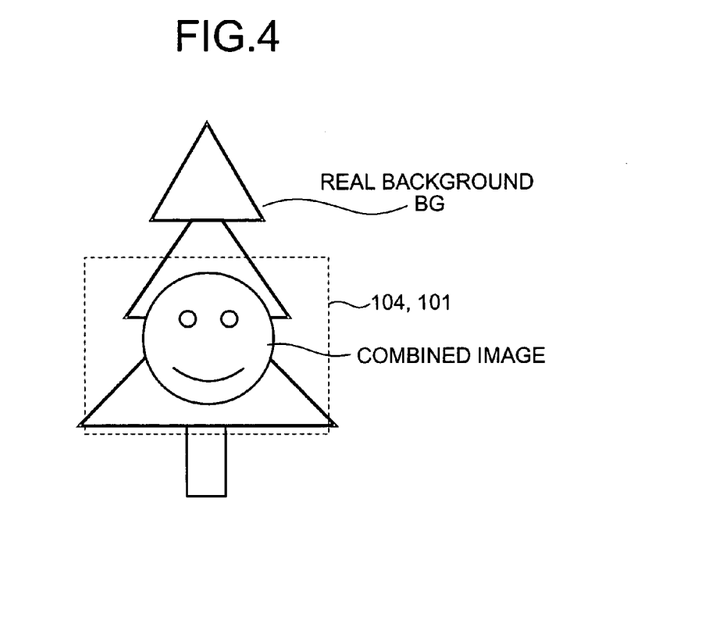
FIG. 4 is a schematic for explaining an image that an observer OBS viewing a monitor visually recognizes.

As a result, the observer OBS visually recognizes an image as shown in FIG. 4. FIG. 4 is a schematic for explaining an example of images that the observer OBS visually recognizes when viewing the monitor 101. As shown in FIG. 4, when the observer OBS views the monitor 101 through the optical lens 104, an imaginary image of the monitor image looks continuous to the background surface without any seams. In other words, the observer OBS can recognize as if the image combined by the image processing unit 106 or the text information were displayed overlapped with the background image without presence of the monitor 101.

Figure 5:
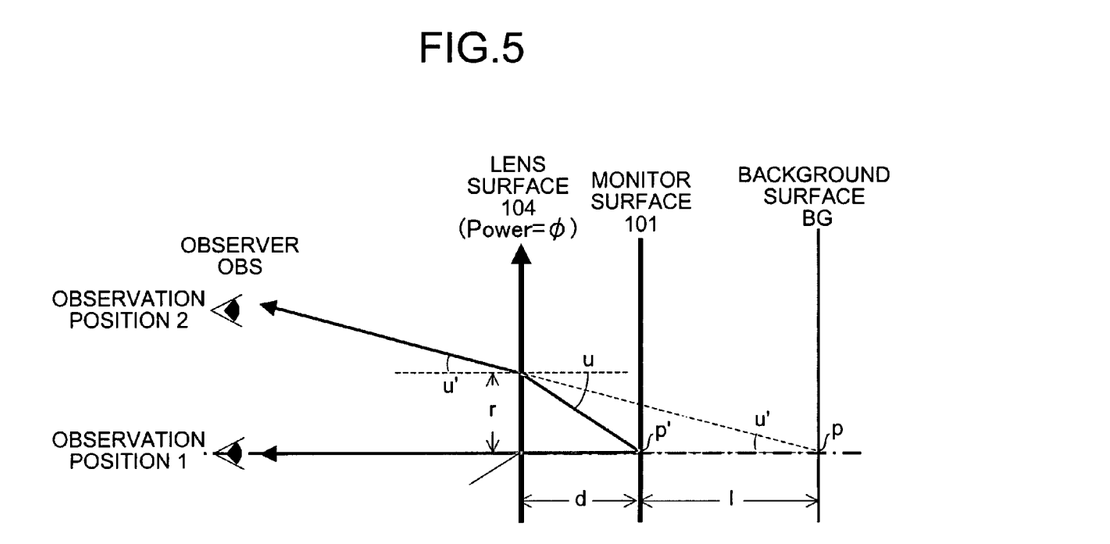
FIG. 5 is a schematic for explaining derivation of Conditional Expression (X2).

Derivation of Conditional Expressions (X1) and (X2) is explained with reference to FIGS. 5 to 7. Firstly, derivation of Conditional Expression (X1) is explained with reference to FIGS. 5 and 6. FIG. 5 is a schematic for explaining derivation of Conditional Expression (X1). Conditional Expression (X1), as described above, determines the distance between the monitor 101 and the optical lens 104 such that the parallax between the monitor image and the background BG substantially matches. "Matching the parallax" means that a light ray from a specific point selected from any points on the background surface and a light ray from the point on the monitor 101 corresponding to the specific point reach the observer OBS at an identical angle regardless of where an observation position of the observer OBS. In other words, the imaginary image, obtained due to presence of the optical lens 104, of the monitor image matches with the background surface. When the parallax is matched in this manner, the observer OBS can not differentiate between the light ray from the monitor 101 and the one from the background surface. In other words, the observer OBS recognizes as if the monitor image was displayed on the background surface. When the parallax is matched, convergence (rotation angle of the crystal lens) and focal point (thickness of the crystal lens) also match.

In FIG. 5, a point P on the background surface corresponds to a point P' on the monitor 101. When the observer OBS views from an observation position 1, both a light ray from P and a light ray from P' reach at an angle of 0 (from horizontal surface). When the observer OBS views from an observation position 2, a light ray from the point P on the background BG surface reaches at an angle of u'. To make the light ray from the point P' reach at the angle of u', according to the paraxial theory, the distance d between the monitor 101 and the optical lens 104 must satisfy the following Conditional Expression (X1):

[Expression 1]

$$d = \frac{\sqrt{l \cdot \phi(l \cdot \phi + 4)} - l \cdot \phi}{2\phi} \quad (X1)$$

where l is a distance between the monitor 101 and the background surface, φ is a power (refracting power) of the optical lens 104 (the refracting power of a lens is defined by φ=1/f, where f is a focal distance of the lens).

Figure 6:
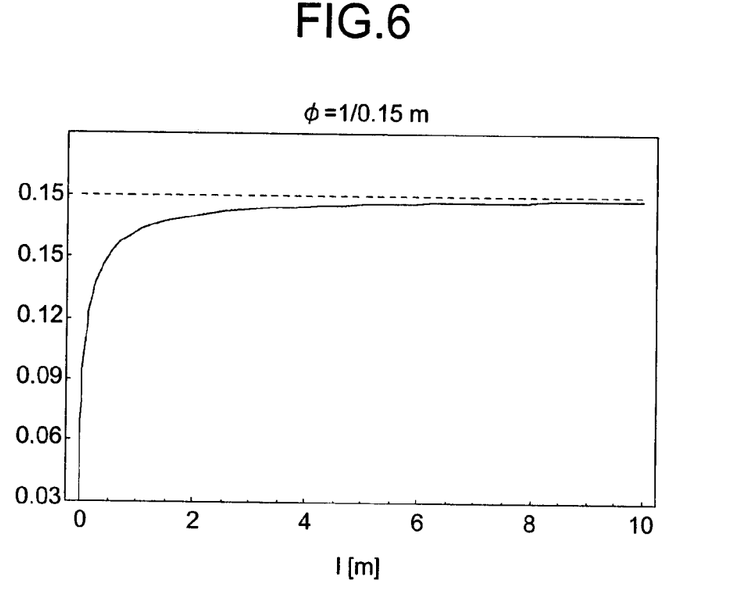
FIG. 6 is a graph of a relationship between a distance l [m] between a display monitor and a background BG surface and a distance d [m] between the display monitor and an optical lens.
Figure 7:
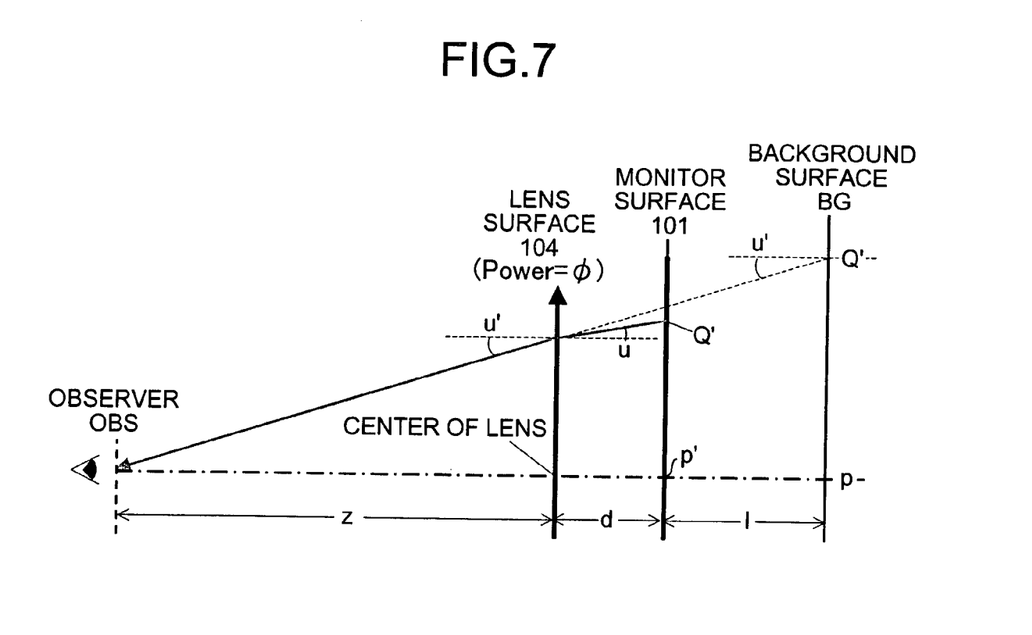
FIG. 7 is a schematic for explaining derivation of Conditional Expression (X2).

FIG. 6 is a graph of a relationship between the distance l [m] between the monitor 101 and the background surface and the distance d [m] between the monitor 101 and the optical lens 104 calculated by using Conditional Expression (X1) assuming φ=1/0.15 [m]. In the figure, the horizontal axis represents the distance l [m] between the monitor 101 and the background surface, and the vertical axis represents the distance d [m] between the monitor 101 and the optical lens 104. As shown in the figure, when the distance l between the monitor 101 and the background surface is relatively long, the distance d between the monitor 101 and the optical lens 104 becomes almost constant. It means that in a case the distance l between the monitor 101 and the background surface is determined in advance not to vary to a relatively small value (about 2 m or shorter in the example shown in FIG. 6), the system works under conditions that the distant d between the monitor 101 and the optical lens 104 is set to the fixed value (d=1/φ) obtained by Conditional Expression (X1) without adjusting the distance d. Therefore, in the present invention, when the distance l between the monitor 101 and the background surface is longer, the distance adjustment mechanism 105 that adjusts the distance between the monitor 101 and the optical lens 104 is not always required. [0030] Derivation of Conditional Expression (X2) is explained with reference to FIG. 7. FIG. 7 is a schematic for explaining derivation of Conditional Expression (X2). Conditional Expression (X2), as described above, determines a size (magnification) of the background image displayed on the monitor 101. In FIG. 7, two points P and Q on the background surface correspond to points P' and Q' on the monitor 101, respectively; φ is a refracting power of the optical lens 104; d is the distance between the monitor 101 and the optical lens 104; and z is a distance between the monitor 101 and the observer OBS. A magnification Mg, which is a display size of the background image displayed on the monitor 101 with respect to the real background size, is expressed according to the paraxial theory by following Expression (1)

[Expression 2]

$$Mg = \frac{z + d - zd\phi}{z + d + 1} \quad (1)$$

Because Expression (1) is dependent on z, the magnification of the background image displayed on the monitor needs to be varied depending on the position of the observer OBS. The following Conditional Expression (X2), however, can be obtained by substituting Conditional Expression (X1) in Expression (1) and analyzing the substituted Expression using the method of approximation.

[Expression 3]

$$Mg \approx \frac{\sqrt{l\phi(l\phi+4)} - l\phi}{\sqrt{l\phi(l\phi+4)} + l\phi} \quad (X2)$$

In this manner, when the conditions set by Conditional Expressions (X1) and (X2) are satisfied, the background image displayed on the monitor 101 and the real background BG look seamless to the observer OBS who views the monitor 101 through the optical lens 104.

Figure 8:
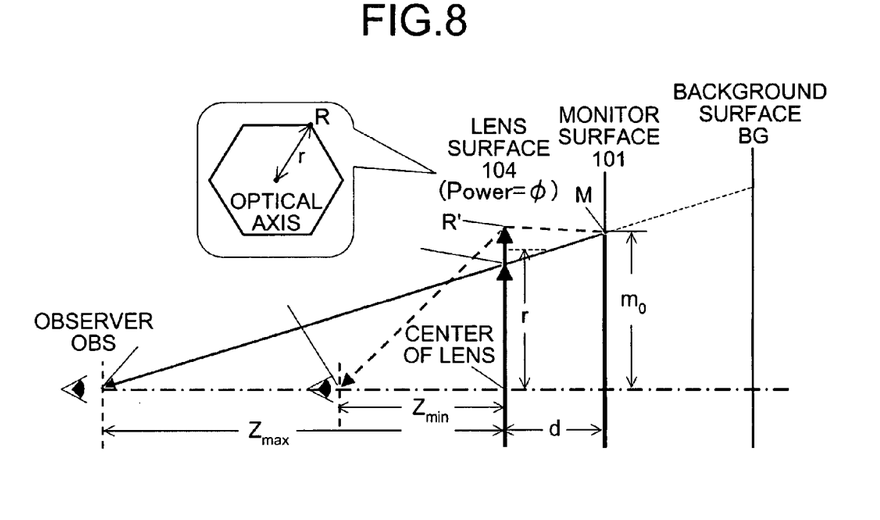
FIG. 8 is a schematic for explaining derivation of Conditional Expressions (X3) and (X4).

However, even if Conditional Expressions (X1) and (X2) are satisfied, depending on the viewpoint of the observer OBS, it is possible that the observer OBS sees the monitor 101 directly, i.e., not through the optical lens. In such a case, the background BG image and the monitor image do not look seamless to the observer OBS. Conditional Expressions (X3) and (X4) for preventing the direct viewing, not through the optical lens 104, of the monitor are explained. FIG. 8 is a schematic for explaining derivation of Conditional Expressions (X3) and (X4).

In FIG. 8, r is a lens size of a surface of the optical lens 104 parallel to the background surface measured from an optical axis in a direction (predetermined direction); $m_0$ is a monitor size measured from an optical axis in the direction identical to that for the optical lens 104; and $z_{min}$ and $z_{max}$ are a minimum value and a maximum value of the distance z between the observer OBS and the lens assumed from the system. Firstly, the minimum value of the lens size is considered. It is only necessary that an edge R of the optical lens 104 is set above a line passing through viewpoints O and M of the observer OBS to cause an edge M of the monitor 101 not to be seen from a point of $z=z_{max}$ where the observer OBS is farthest away from the optical lens 104. Following Expression (2) that satisfies these conditions can be derived:

[Expression 4]

$$\frac{m_0 \cdot z_{max}}{d + z_{max}} \leq r \quad (2)$$

Next, the maximum value of the lens size is considered. It is only necessary that a light ray from the monitor 101 to an observation position O' of the observer OBS via an edge R' of the optical lens 104 passes closer to the optical axis than to the edge M of the monitor 101 from a point of $z=z_{min}$ where the observer OBS is closest to the optical lens 104. Following Expression (3) satisfies these conditions:

[Expression 5]

$$r \leq \frac{m_0 \cdot z_{min}}{d + z_{min}(1 - d \cdot \phi)} \quad (3)$$

The following Conditional Expression (X3) is derived from Expressions (2) and (3):

[Expression 6]

$$\frac{m_0 \cdot z_{max}}{d + z_{max}} \leq r \leq \frac{m_0 \cdot z_{min}}{d + z_{min}(1 - d \cdot \phi)} \quad (X3)$$

From the conditions that right-hand sides are always larger than left-hand sides in Conditional Expression (X3), the following Conditional Expression (X4) for limiting a range of the refracting power $\phi$ or the focal distance f ($=1/\phi$) can be derived:

[Expression 7]

$$\phi \geq \frac{z_{max} - z_{min}}{z_{min} z_{max}} \text{ or } f \leq \frac{z_{min} z_{max}}{z_{max} - z_{min}} \quad (X4)$$

As described above, if Conditional Expressions (X3) and (X4) are satisfied in addition to Conditional Expressions (X1) and (X2), the monitor 101 is always viewed through the optical lens 104 or the edge of the monitor 101 can not be seen through the optical lens 104 from any viewpoints to which the observer OBS is assumed by the system to move forward or backward. As a result, it is possible for the observer OBS to always recognize the background image and the monitor image seamless.

Figure 9:
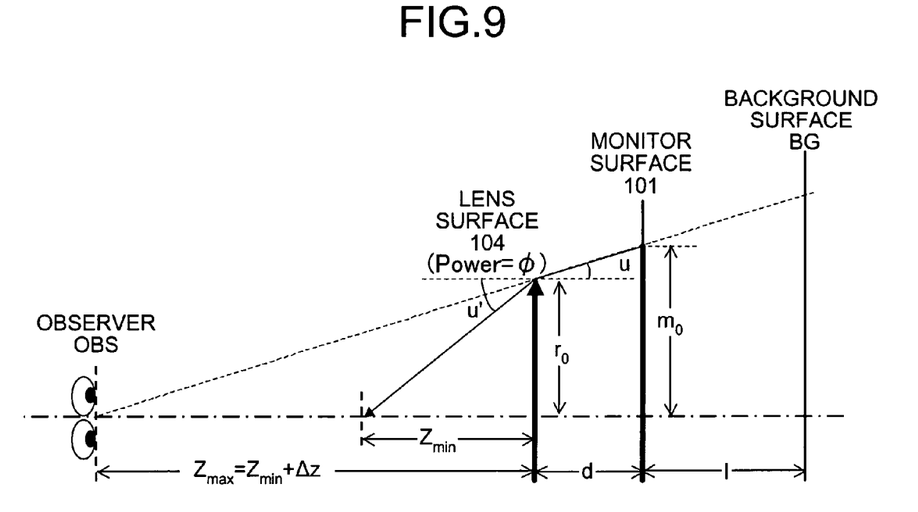
FIG. 9 is a schematic for explaining derivation of Conditional Expression for limiting a range of observation positions of the observer OBS and Conditional Expression for obtaining lens properties from the limitation of observation positions.

Conditional Expression for limiting a range of observation positions of the observer OBS and Conditional Expression for obtaining lens properties from the limitation of observation positions are explained with reference to FIGS. 9 to 12. FIG. 9 is a schematic for explaining derivation of Conditional Expression for limiting a range of observer observation positions of the observer OBS and Conditional Expression for obtaining lens properties from the limitation of observation positions.

In FIG. 9, $r_0$ is a lens size of the surface of the optical lens 104 parallel to the background surface measured from the optical axis in a direction (predetermined direction); and $\Delta z$ is a range within which the observer OBS can view in an axis vertical to the background surface. The distance z between the monitor 101 and the observer OBS is expressed according to the paraxial theory by following Expression (4):

[Expression 8]

$$\frac{r_0 d}{m_0 - r_0 + r_0 d\phi} \leq z \leq \frac{r_0 d}{m_0 - r_0} \quad (4)$$

Figure 10:
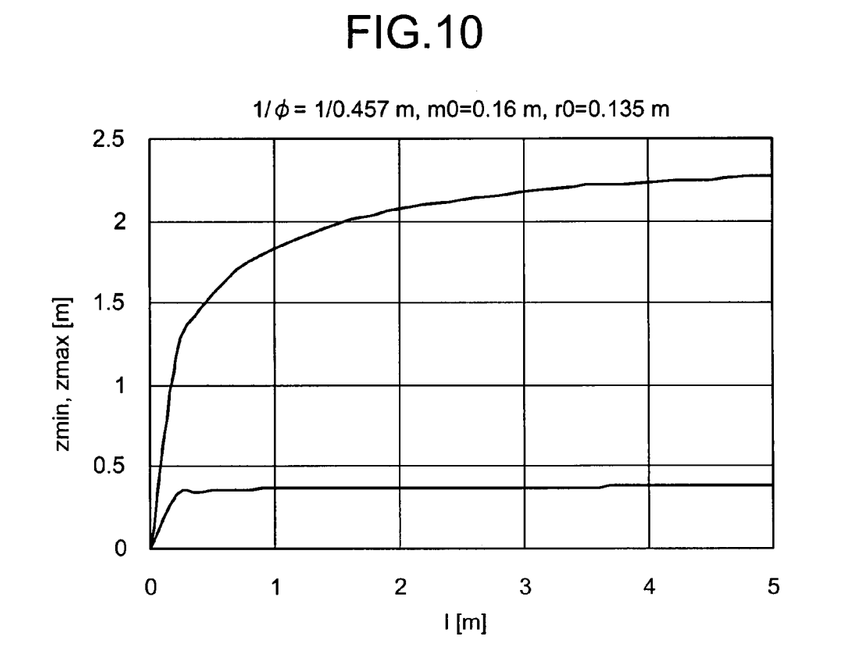
FIG. 10 is a graph of a relationship between the distance l [m] between a display monitor and a background BG surface and $z_{min}$ and a relationship between the distance l and $z_{max}$.

Expression (4) is a function of d. When Conditional Expression (X1) is applied to Expression (4), Expression as a function of l is appeared. FIG. 10 is a graph of a relationship between the distance l [m] between the monitor 101 and the background surface and $z_{min}$ and a relationship between the distance l and $z_{max}$, where $1/\phi=1/0.457$ m, $m_0=0.16$ m, and $r_0=0.135$ m. Following Expression (5) limits the lens size:

[Expression 9]

$$\frac{m_0 \cdot (z_{min} + \Delta z)}{d + (z_{min} + \Delta z)} \le r \le \frac{m_0 \cdot z_{min}}{d + z_{min}(1 - d \cdot \phi)} \quad (5)$$

When $\phi$ is resolved from Expression (5), Conditional Expression (6) for limiting the focal distance or the power (refracting power) of the lens is derived as follows:

[Expression 10]

$$\phi \ge \frac{\Delta z}{z_{min}(z_{min} + \Delta z)} \text{ or} \quad (6)$$

$$f \le z_{min}\left(1 + \frac{z_{min}}{\Delta z}\right)$$

Figure 11:
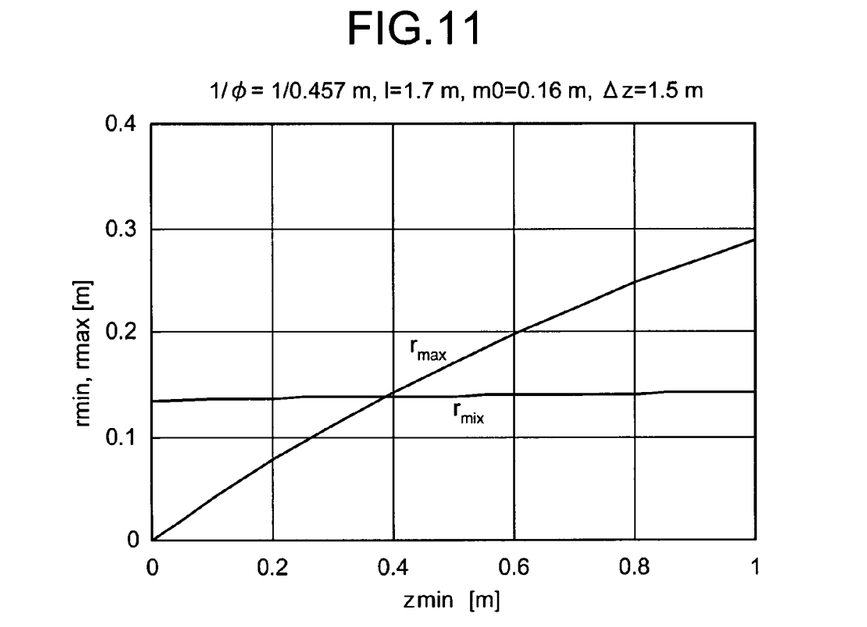
FIG. 11 is a graph of a relationship between $z_{min}$ and $r_{min}$ and a relationship between $z_{min}$ and $r_{max}$.
Figure 12:
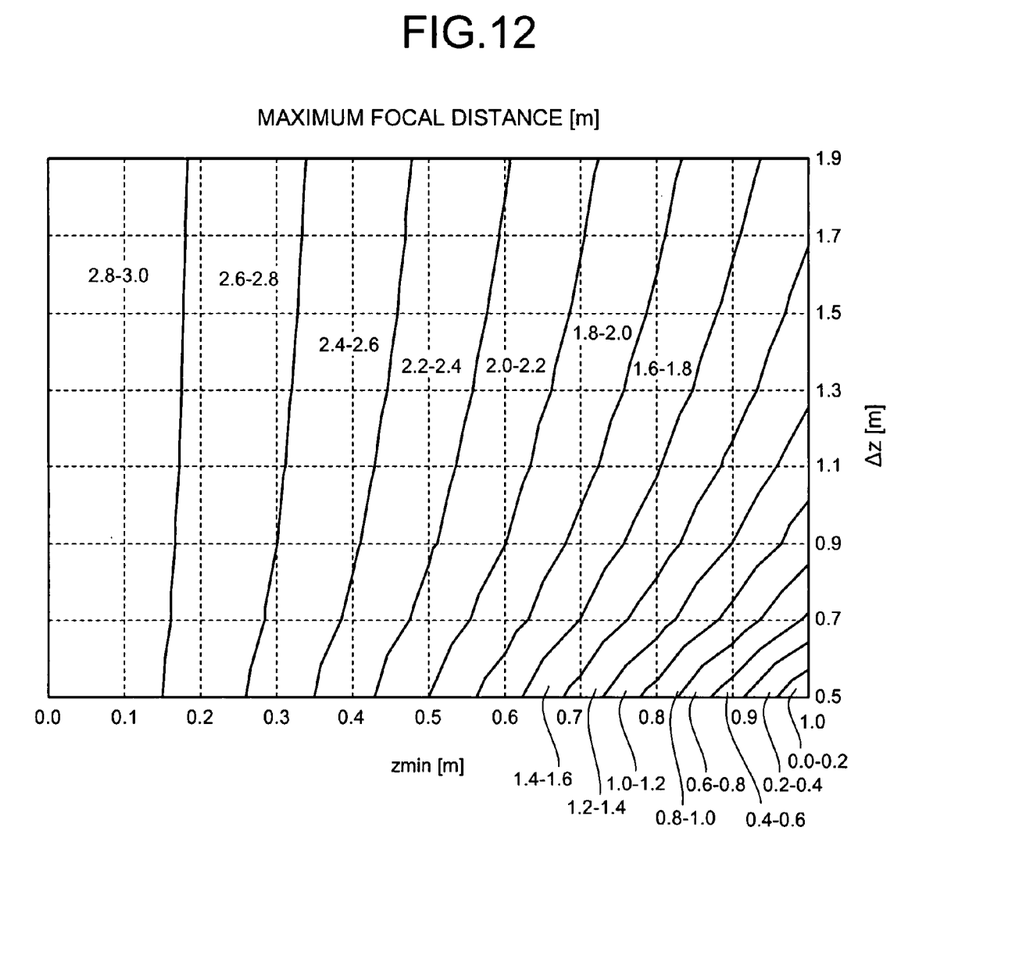
FIG. 12 is a graph of a maximum focal distance.

FIG. 11 is a graph of a relationship between $z_{min}$ and $r_{min}$ and a relationship between $z_{min}$ and $r_{max}$, where $1/\phi=1/0.457$ m, $m_0=0.16$ m, and $r_0=0.135$ m. FIG. 12 is a contour graph of the maximum focal distance, where the horizontal axis is $z_{min}$ and the vertical axis is $\Delta z$.

As described above, the camera 102 that shoots the background, the monitor 101 that displays the shot background image, and the optical lens 104 arranged on the display surface of the monitor 101 are included, and the imaginary image, obtained due to presence of the optical lens 104, of the monitor image is made to substantially match with the background surface of the monitor 101 according to the first embodiment. Therefore, the observer OBS viewing the monitor 101 through the optical lens 104 can recognize that the monitor image and the background BG look continuous.

Moreover, according to the first embodiment, there are provided the distance measuring unit 103 that measures the distance l between the monitor 101 and the background surface and the distance adjustment mechanism 105 that adjusts the distance d between the optical lens 104 and the monitor 101 are further included. The distance adjustment mechanism 105 adjusts the distance d between the monitor 101 and the optical lens 104 based on the distance l between the monitor 101 and the background surface measured by the distance measuring unit 103 according to Conditional Expression (X1). Therefore, because the observer OBS can not distinguish between the light ray from the monitor 101 and the one emitted from the background surface, the observer OBS can recognize as if the monitor image was displayed on the background surface.

Furthermore, according to the first embodiment, the display-size converting section 112 of the image processing unit 106 magnifies or reduces the background image based on the distance l between the monitor 101 and the background surface measured by the distance measuring unit 103 according to Conditional Expression (X2), where l is a distance between the monitor 101 and the background surface, and $\phi$ is a power of the optical lens 104. Therefore, the observer OBS can recognize that the size of the background image displayed on the monitor 101 and that of the real background BG look identical.

Moreover, according to the first embodiment, the lens size r of the optical lens 104 measured from the optical axis in the predetermined direction is set to satisfy Conditional Expression (X3), where $m_0$ is a monitor size from the optical axis in the predetermined direction; $\phi$ is a power of the optical lens 104; $z_{min}$ is a minimum distance between the observer OBS and the optical lens 104; and $z_{max}$ is a maximum distance between the observer OBS and the optical lens 104. Furthermore, either the power $\phi$ or the focal distance f of the optical lens 104 is set to satisfy Conditional Expression (X4). Therefore, it is possible to prevent having the monitor 101 directly viewed not through the optical lens 104 or having the edge M of the monitor 101 visible through the optical lens 104.

Moreover, according to the first embodiment, the combined-image generating section 111 of the image processing unit 106 generates the combined image by combining the additional image with the background image. Therefore, it is possible to embody the augmented reality in a feeling like viewing the real world in the ordinary life environment with the realistic combined image.

Second Embodiment

Figure 13:
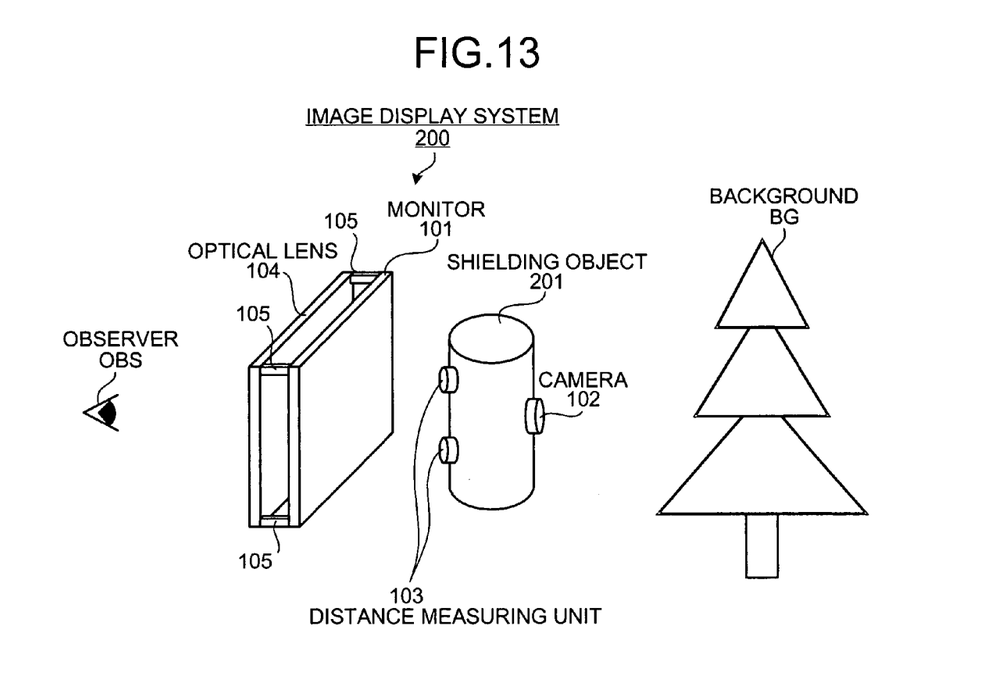
FIG. 13 is an overview schematic of an image display system according to a second embodiment.

FIG. 13 is an overview schematic of an image display system 200 according to a second embodiment. In FIG. 13, components having functions equivalent to those shown in FIG. 2 are denoted with the same letters or numbers. Although the camera 102 and the distance measuring unit 103 are integrated with the monitor 101 in the image display system 100 according to the first embodiment, it is not always necessary to integrate those units. The image display system 200 according to the second embodiment, as shown in FIG. 13, has a configuration in which the camera 102 and the distance measuring unit 103 are arranged on a shielding object 201 placed between the monitor 101 and the background BG. The camera 102 is arranged so as to face toward the background BG, and the distance measuring unit 103 is arranged so as to face toward the monitor 101. A distance between the shielding object 201 and the monitor 101 is measured by the distance measuring unit 103, while a distance between the background surface and the shielding object 201 is fixed. This structure makes it possible to determine the distance l between the monitor 101 and the background surface. It is also allowable to have an alternative configuration in which the distance between the shielding object 201 and the monitor 101 is fixed and the distance between the background surface and the shielding object 201 is measured by the distance measuring unit 103 arranged on the camera side.

According to the second embodiment, because the camera 102 is arranged on the shielding object 201, it is possible to cause the observer OBS to visually recognize as if the shielding object 201 was not present. The image display system 200 according to the second embodiment can be applied as, for example, an in-vehicle image display device. In this case, the present embodiment is applied so that, for example, a post that connects the body to the roof (a portion generally expressed as pillar) of a moving object is used as the shielding object, the monitor is arranged on a surface of the pillar that is inside the vehicle, and the camera is arrange on a surface of the pillar that is outside the vehicle. With such a structure, a driver can visually recognize the world outside of the vehicle as if the pillar was not present.

Third Embodiment

Although the camera 102 that shot the background BG is explained to be arranged between the monitor 101 and the background BG according to the first and the second embodiment, a position of the camera 102 is not specially limited according to the present invention. However, when a position of the camera 102 is significantly far away from a position of the observer OBS, even if conditions such as the parallax conditions and the display magnification are adjusted with Conditional Expressions (X1) and (X2), the background image shot by the camera 102 is significantly different from the background BG viewed from the position of the observer OBS, which makes it difficult to obtain the seamless viewing.

An image display system 3 according to a third embodiment that solves the above problem is explained. The image display system 300 can generate a background image that seems like one shot by a camera set at a viewpoint of the observer OBS using the well-known technique of arbitrary viewpoint image generation (see "Real-Time System for Image-Based Rendering from a Multi-View Video" by Takeshi Yoshimura et al., in TVRSJ (1999), Vol. 4, No. 4).

Figure 14:
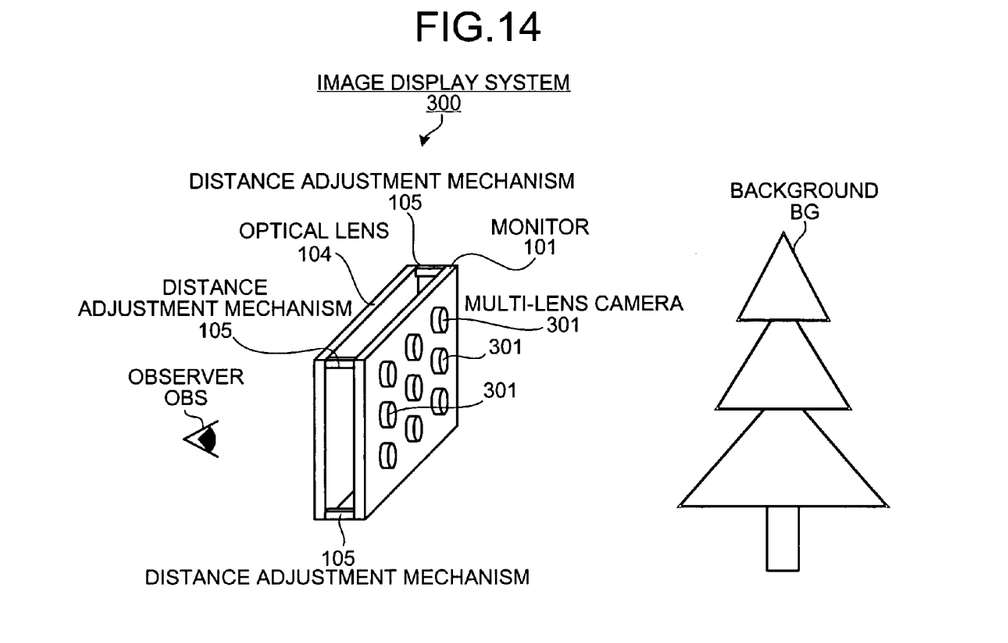
FIG. 14 is an overview schematic of an image display system according to a third embodiment.

FIG. 14 is an overview schematic of the image display system 300 according to the third embodiment. In FIG. 14, components having functions equivalent to those shown in FIG. 2 are denoted with the same letters or numbers. The image display system 300 according to the third embodiment, as shown in FIG. 14, includes a multi-lens camera 301 made up of 3×3 cameras arranged on the background surface of the monitor 101. It is not always necessary to arrange the multi-lens camera on the monitor 101.

Figure 15:
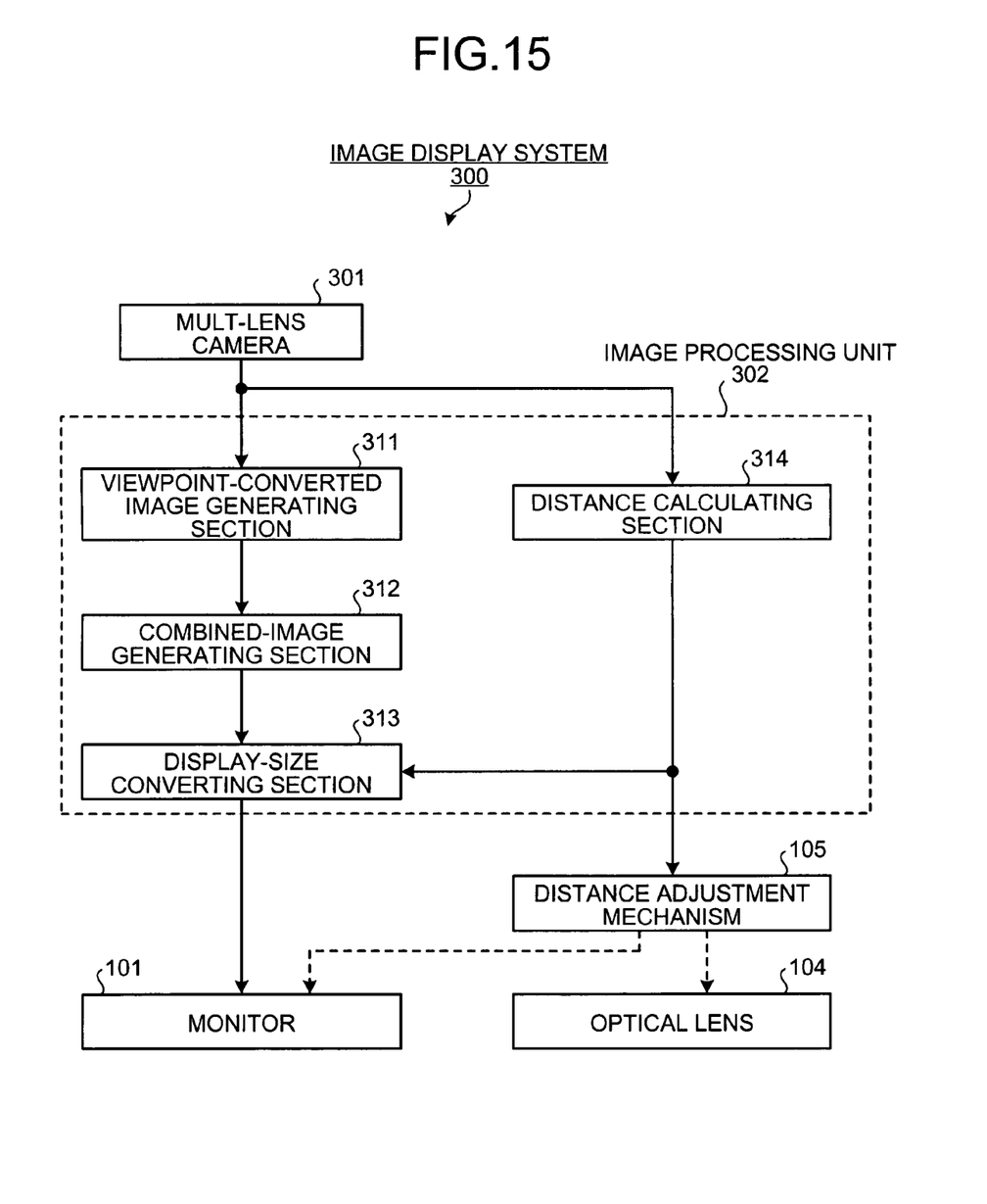
FIG. 15 is a block diagram of the image display system according to the third embodiment.

FIG. 15 is a functional block diagram of the image display system 300 according to the third embodiment. In FIG. 15, members having a function equivalent to those shown in FIG. 3 are denoted with the same letters or numbers. In FIG. 15, the multi-lens camera 301 shoots a plurality of the background images. Based on the background images, the background image expected to be viewed from a position of the observer is generated, and the distance l between the monitor 101 and the background surface using the technique such as the stereo method.

An image processing unit 302 includes a distance calculating section 314 that calculates the distance l between the monitor 101 and the background surface based on the background images shot by the multi-lens camera 301 using the stereo method or the like, a viewpoint-converted image generating section 311 that generates the background image expected to be viewed from a position of the observer based on the background images shot by the multi-lens camera 301, a combined-image generating section 312 that combines the additional image with the background image following an instruction from the controller (not shown), and a display-size converting section 313 that magnifies or reduces the background image or the combined image based on the distance l between the monitor 101 and the background surface measured by the distance calculating section 314 using Conditional Expression (X2).

The background image or the combined image magnified or reduced by the display-size converting section 313 is displayed on the monitor 101. The distance adjustment mechanism 105 adjusts the distance d between the monitor 101 and the optical lens 104 based on the distance l between the monitor 101 and the background surface according to Conditional Expression (X1).

According to the third embodiment, the multi-lens camera 301 shoots a plurality of the background images, and the viewpoint-converted image generating section 311 generates the observer's viewpoint-based background image based on the background images. Therefore, the background image expected to be viewed from a position of the observer can be displayed with regardless of a position of the camera.

INDUSTRIAL APPLICABILITY

As described above, the image display system and the image display method according to the present invention is effective in general for the image display devices and the in-vehicle image display devices.

The invention claimed is:

1. An image display system that causes an observer to recognize that a monitor image and a background look continuous, the image display system comprising:
   a camera that shoots the background;
   a monitor that displays the shot background image; and
   an optical lens that is arranged between a display surface of the monitor and the observer, wherein an imaginary image, obtained due to presence of the optical lens, of the monitor image is made to substantially match with a background surface,
   wherein the camera is arranged on a shielding object placed between the monitor and the background, and
   a distance d between the monitor and the optical lens satisfies following Expression (X1)

$$d \approx \frac{\sqrt{l\phi(l\phi+4)} - l\phi}{2\phi} \tag{X1}$$

where l is a distance between the monitor and the background surface, and
φ is a power of the optical lens.

2. The image display system according to claim 1, further comprising:
   a distance measuring unit that measures the distance l between the monitor and the background surface; and
   a distance adjustment mechanism that adjusts the distance d between the monitor and the optical lens, wherein the distance adjustment mechanism adjusts the distance d by using Expression (X1) based on the distance l between the monitor and the background surface measured by the distance measuring unit.

3. The image display system according to claim 1, wherein a magnification Mg of the background image displayed on the monitor satisfies following Expression (X2)

$$Mg \approx \frac{\sqrt{l\phi(l\phi+4)} - l\phi}{\sqrt{l\phi(l\phi+4)} + l\phi}. \tag{X2}$$

4. The image display system according to claim 3, further comprising:
   a distance measuring unit that measures the distance l between the monitor and the background surface; and
   a display-size converting unit that converts the magnification Mg of the background image displayed on the monitor, wherein the display-size converting unit converts the magnification Mg by using Expression (X2) based on the distance l between the monitor and the background surface measured by the distance measuring unit.

5. The image display system according to claim 1, wherein a lens size r measured from an optical axis of the optical lens in a predetermined direction satisfies following Expression (X3)

$$\frac{m_0 \cdot z_{max}}{d + z_{max}} \leq r \leq \frac{m_0 \cdot z_{min}}{d + z_{min}(1 - d \cdot \phi)} \tag{X3}$$

where $m_0$ is a monitor size measured from an optical axis of the monitor in the predetermined direction,
$z_{min}$ is a minimum distance between the monitor and the optical lens, and $z_{max}$ is a maximum distance between the monitor and the optical lens.

6. The image display system according to claim 1, further comprising a combined-image generating unit that generates a combined image by combining an additional image with the background image, wherein the monitor displays the combined image.

7. The image display system according to claim 1, wherein the camera is a multi-lens camera, and the image display system further comprises a viewpoint-converted-image generating unit that generates an observer's viewpoint-based background image based on a plurality of background images shot by the multi-lens camera.

8. An image display method that causes an observer to recognize that a monitor image and a background look continuous, the image display method comprising:

a step of shooting the background; and a step of displaying a shot background image on a display surface of the monitor at which an optical lens is arranged, wherein an imaginary image, obtained due to presence of the optical lens, of the monitor image is made to substantially match with a background surface, wherein a distance d between the monitor and the optical lens satisfies following Expression (X1)

$$d \approx \frac{\sqrt{l\phi(l\phi+4)} - l\phi}{2\phi} \qquad (X1)$$

where l is a distance between the monitor and the background surface, and $\phi$ is a power of the optical lens.

* * * * *